United States Patent
Jones et al.

(10) Patent No.: US 10,827,768 B2
(45) Date of Patent: Nov. 10, 2020

(54) PAN SYSTEM FOR SELECTIVELY RELEASING A FOOD PRODUCT

(71) Applicant: Conagra Foods RDM, Inc., Chicago, IL (US)

(72) Inventors: Marcus S. Jones, Parsippany, NJ (US); Gregory A. Ornoski, Parsippany, NJ (US); Craig P. Massey, Parsippany, NJ (US)

(73) Assignee: Conagra Foods RDM, Inc., Chicago, IL (US)

( * ) Notice: Subject to any disclaimer, the term of this patent is extended or adjusted under 35 U.S.C. 154(b) by 382 days.

(21) Appl. No.: 14/697,138

(22) Filed: Apr. 27, 2015

(65) Prior Publication Data

US 2016/0095470 A1  Apr. 7, 2016

Related U.S. Application Data

(60) Provisional application No. 62/059,604, filed on Oct. 3, 2014.

(51) Int. Cl.
*A23L 5/00* (2016.01)
*A21B 3/13* (2006.01)
*A23L 5/10* (2016.01)

(52) U.S. Cl.
CPC .............. *A23L 5/15* (2016.08); *A21B 3/137* (2013.01); *A23V 2002/00* (2013.01)

(58) Field of Classification Search
CPC .......... A47J 37/00; A47J 37/01; A47J 37/015; A47J 36/16; A47J 36/165; A47J 36/18; A47J 36/20; A47J 36/022; A47J 36/027; A47J 37/1214; A47J 19/04; A47J 19/03; A47J 19/02; B65D 21/0228; B65D 23/0857; B65D 41/16; B65D 41/165; B65D 41/17; B65D 43/0204; B65D 2519/00567;
(Continued)

(56) References Cited

U.S. PATENT DOCUMENTS 2,274,982 A * 3/1942 Hammond ............... B65D 7/14
217/123
3,764,017 A * 10/1973 Dover ..................... A47J 31/02
210/481
(Continued)

OTHER PUBLICATIONS

"Arcuate." Merriam-Webster's Dictionary. Apr. 10, 2010. <https://web.archive.org/web/20100410170148/http://www.merriam-webster.com/dictionary/arcuate>. Accessed Aug. 24, 2016.*
(Continued)

*Primary Examiner* — Ericson M Lachica
(74) *Attorney, Agent, or Firm* — Ryan T. Grace; Advent, LLP

(57) ABSTRACT

A pan system may have a closed configuration and an open configuration to selectively release a food product. The system comprise a base portion having a sidewall connected to a bottom with an opening, a removable portion configured to span the opening, and an attachment configured to releasably secure the removable portion relative to the base portion in the closed condition and selectively release the removable portion from the base portion in the open condition. The base portion and removable portion may be configured to contain the food product in the closed condition and separate to release the food product from the base portion in the open condition.

20 Claims, 7 Drawing Sheets

(58) Field of Classification Search
CPC .......... B65D 2543/00592; B65D 55/02; Y10T 403/7005; Y10T 403/7009; Y10T 403/7045; A47G 19/04; A47G 19/03; A47G 19/02; A21B 3/13; A21B 3/131; A21B 3/136; A21B 3/137; A23L 1/0128; A23L 5/15
USPC ....... 426/112, 115, 128, 106, 107, 113, 389; 220/573.1, 573.2, 573.3, 573.4, 912, 220/359.1, 561, 610, 615, 612, 625, 626, 220/627, 574; 99/426, 432, 433, 443 R, 99/448, 449, 450; 249/127; 493/128; 215/224, 208, 205, 256, 314, 318; 292/176
See application file for complete search history.

(56) References Cited

U.S. PATENT DOCUMENTS

| | | | | |
|---|---|---|---|---|
| 5,582,389 A * | 12/1996 | Greene | ................. | A47J 36/022 229/235 |
| 5,605,646 A * | 2/1997 | Colombo | .............. | A47J 36/022 249/134 |
| 6,793,193 B2 * | 9/2004 | de Groote | .............. | A23G 1/226 249/119 |
| 2005/0217498 A1 * | 10/2005 | Miller | ..................... | A47J 43/20 99/426 |
| 2011/0088566 A1 * | 4/2011 | Doxie | .................... | A21B 3/137 99/426 |
| 2013/0140320 A1 * | 6/2013 | Nadella | .............. | B65D 81/3867 220/737 |
| 2015/0150392 A1 * | 6/2015 | de Leon | ................. | A47G 19/04 220/574 |

OTHER PUBLICATIONS

"Clasp." vocabulary.com. Jan. 1, 2013. <http://www.vocabulary.com/dictionary/clasp>. Accessed Mar. 13, 2018. (Year: 2013).*

"Mechanical fastening." Process Encyclopaedia. Aug. 14, 2007. <http:www-materials.eng.cam.ac.uk/mpsite/process_encyc/non-IE/mechanical_fastening.html>. Accessed Mar. 13, 2018. (Year: 2007).*

* cited by examiner

PAN SYSTEM FOR SELECTIVELY RELEASING A FOOD PRODUCT

CROSS-REFERENCE TO RELATED APPLICATIONS

The present disclosure is based on and claims priority to U.S. Provisional Application No. 62/059,604, filed Oct. 3, 2014, titled "PAN SYSTEM FOR SELECTIVELY RELEASING A FOOD PRODUCT," which is hereby incorporated by reference in its entirety.

BACKGROUND

Traditional fixed-bottom pans may require a substantial effort to remove food products, for example, after being baked by an oven. Further, food products may be physically impaired during removal from traditional pans. Moreover, traditional pans lack attachments for releasably receiving and selectively releasing food products. Accordingly, there is a need for an improved pan system with a base portion that releasably receives and selectively releases a removable portion with the food product to minimize effort and physical impairment to the food product during removal.

DETAILED DESCRIPTION

A pan system may include a base portion and a removable portion. The base portion may be configured to releasably receive the removable portion (e.g., in a closed configuration) and selectively release the removable portion (e.g., in an open configuration) with food products while minimizing physical impairment to the food products. The removable portion may facilitate removal of food products from the base portion and the subsequent handling of the food products. For example, food products may be removed from an appliance (e.g., a freezer, refrigerator, oven, stove, microwave, or toaster), heated (e.g., defrosted, thawed, cooked, or baked), released from the base portion with the removable portion, and served on the removable portion. Thus, the pan system may allow the removable portion to "pop out" of the base portion for improved removal, handling, and serving of food products.

Figure 1:
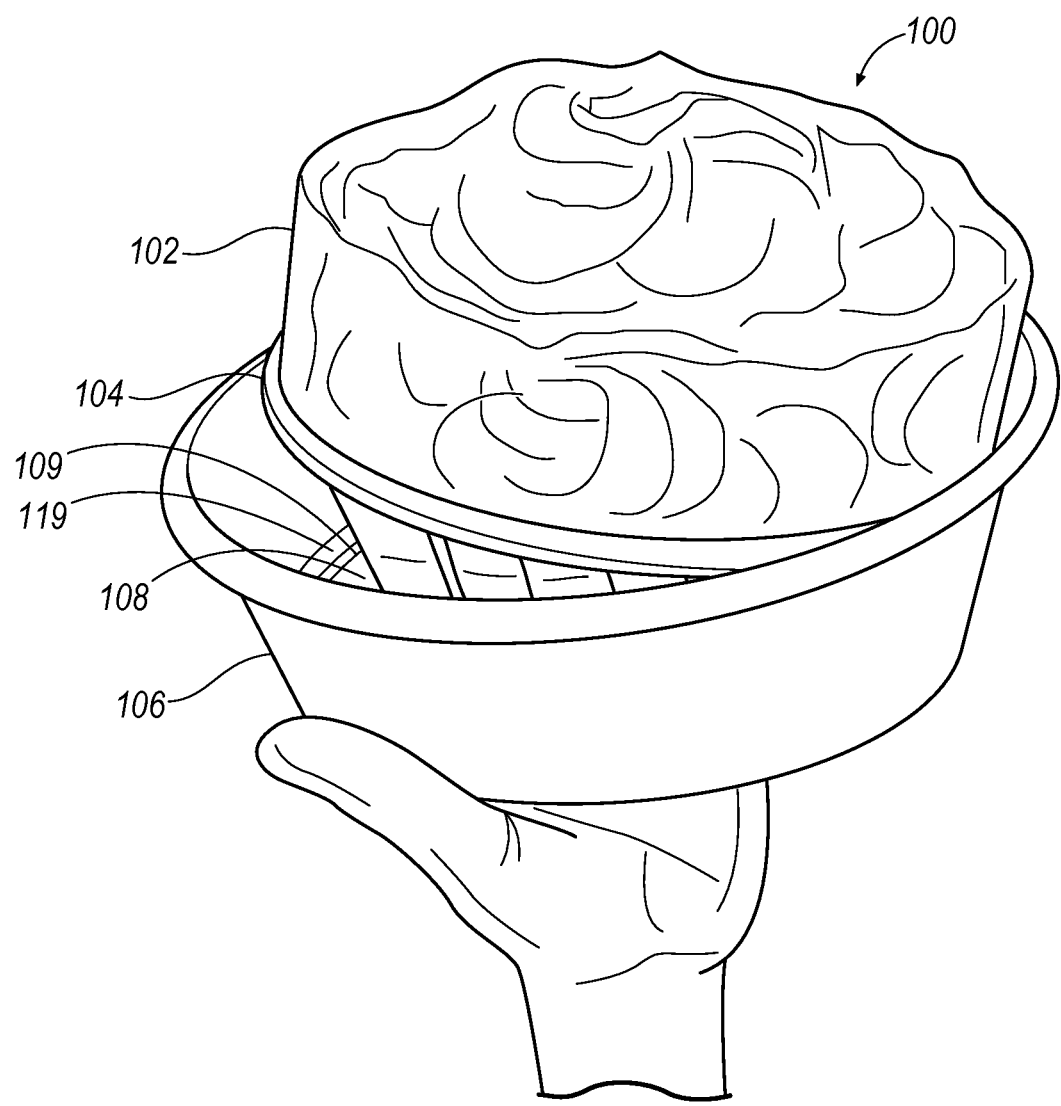
FIG. 1 illustrates an exemplary pan system of the present disclosure.

FIG. 1 illustrates an exemplary pan system 100. System 100 may take many different forms and include multiple and/or alternate components and facilities. While an exemplary pan system 100 is shown in FIG. 1, the exemplary components illustrated in FIG. 1 are not intended to be limiting. Indeed, additional or alternative components and/or implementations may be used.

As illustrated in FIG. 1, system 100 may include a food product 102, a removable portion 104, and a base portion 106 having an opening 108. The opening 108 may be defined by a periphery 109 of a bottom 119 of the base portion 106. The opening 108 may include one or a plurality of openings 108, for example, distributed in any arrangement along the bottom 119 of the base portion 106. The one or plurality of openings 108 may have any shape, pattern, increment, or configuration allowing a user to apply a force to the removable portion 104 through the bottom of the base portion 106.

The removable portion 104 may be releasably attached and selectively removable with respect to the base portion 106. Prior to baking, for example, the removable portion 104 may be positioned in and against the base portion 106 in a closed configuration thereby obstructing the opening 108 to contain the food product 102. After baking, for example, the removable portion 104 may be selectively removed from based portion 106 to an open configuration, for example, by pushing against the removable portion 104 through the opening 108. Thus, the pan system 100 may be configured to allow a user to separate the removable portion 104 from the base portion 106 by pushing through the opening 108 of the base portion 106. Thus, the pan system 100 may be configured to facilitate the removal of the food product 102.

The pan system 100 may be configured for use with any food product 102, for example, a food product 102 that is typically stored at a different temperature than when it is served or consumed. For example, food products 102 may include frozen, ovenable, or microwavable food products that may be served as baked goods. The food product 102 may include any food that may be heated, for example, by defrosting, thawing, cooking, or baking. An exemplary pan system 100 may be heated, for example, by being defrosted such as by removal from a cooling device such as a freezer or refrigerator, thawed by being moved from a freezer to a refrigerator or to ambient air at room temperature, cooked by a heating device such as a stove, microwave, or toaster, or baked by a heating device such as an oven. An exemplary food product 102 may include baked goods resulting from baking uncooked food products 102. For example, the food product 102 may be an uncooked mixture (e.g., a batter including a mixture of water, butter, eggs, and oil) prior to baking that may solidify during baking into a baked good (e.g., a cake).

The pan system 100 may include any food, oven, or microwave grade materials formed in any shape. Exemplary removable portion 104 and base portion 106 may include paperboard, plastic, metal, or a combination thereof. Exemplary paperboard may include solid bleached sulfate (SBS) board. For example, removable portion 104 and base portion 106 may include paperboard that is co-extruded with plastic forming a laminated sheet. The pan system 100 may have any shape, for example, a disc shape (e.g., circular as shown or oval), polygon shape (e.g., rectangular), or seasonal or object shape (e.g., a heart, egg, tree or star). The removable portion 104 and base portion 106 may have the same or any combination of shapes.

Figure 2:
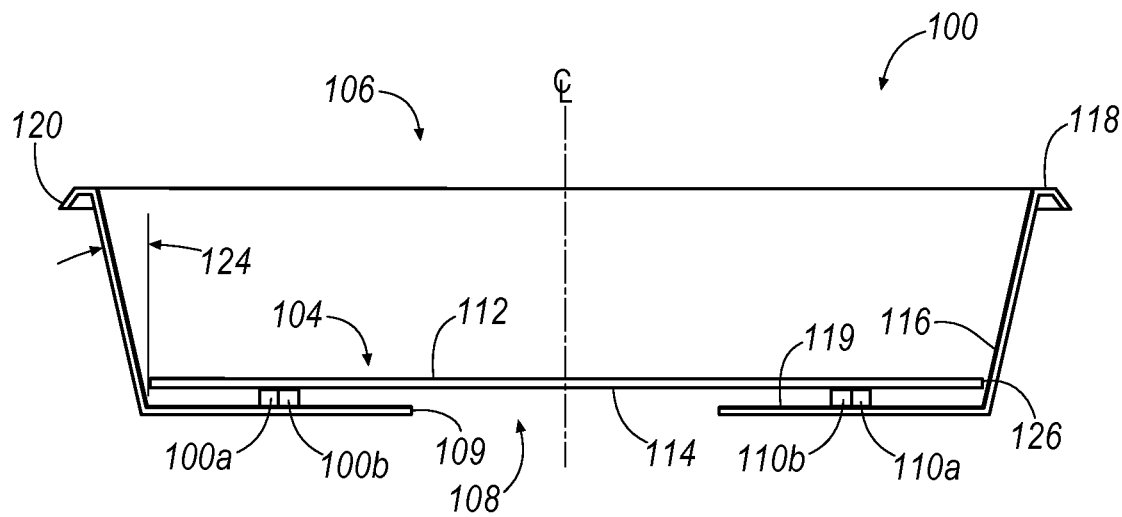
FIG. 2 illustrates an exemplary pan system, for example, in a closed configuration.
Figure 3:
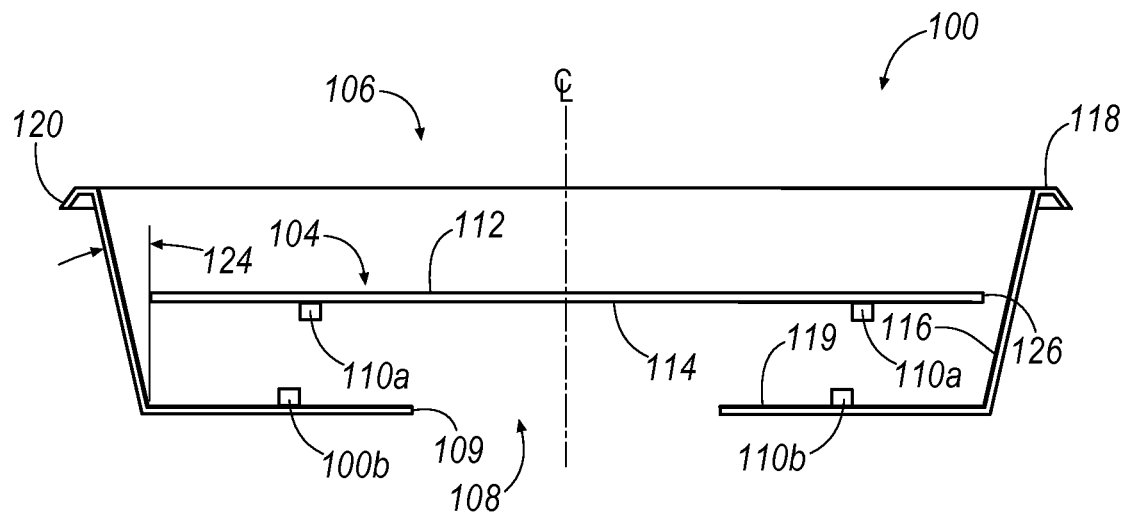
FIG. 3 illustrates an exemplary pan system, for example, in an open configuration.

The pan system 100 may selectively utilize a closed configuration (e.g., prior to thawing or for freezing, cooking, or baking) as shown in FIG. 2 and an open configuration (e.g., after defrosting, thawing, cooking, or baking) as shown in FIG. 3. The pan system 100 may be configured so that the removable portion 104 may releasably received by and selectively removed from the base portion 106. The base portion 106 may include a sidewall 116, a top 118, a bottom 119, and a lip 120, and an opening 108. The sidewall 116 may be tapered with respect to sidewall 116, for example, at angle 124. The bottom 119 may include one or a plurality of openings 108 having any shape (e.g., shown as circular), which may span any portion of bottom 119 and may be the same as or different than the shape of the removable portion 104 or base portion 106. Alternatively or in addition, the sidewall 116 may include one or a plurality of openings 108 having one or a plurality of corresponding removable portions 104.

As shown in FIGS. 2-3, the removable portion 104 may be defined by a top 112, a bottom 114, and a periphery 126, which dimensioned and configured to span any portion of the bottom 119. For example, the removable portion 104 may span any portion of or beyond the opening 108 of the bottom 119 thereby selectively obstructing the opening 108 of base portion 106, for example, in the closed configuration. Thus, the removable portion 104 may be configured to span any portion or the entire bottom 119 of base portion 106, for example, to selectively cover the opening 108 of base portion 106, for example, in the closed configuration.

Figure 4:
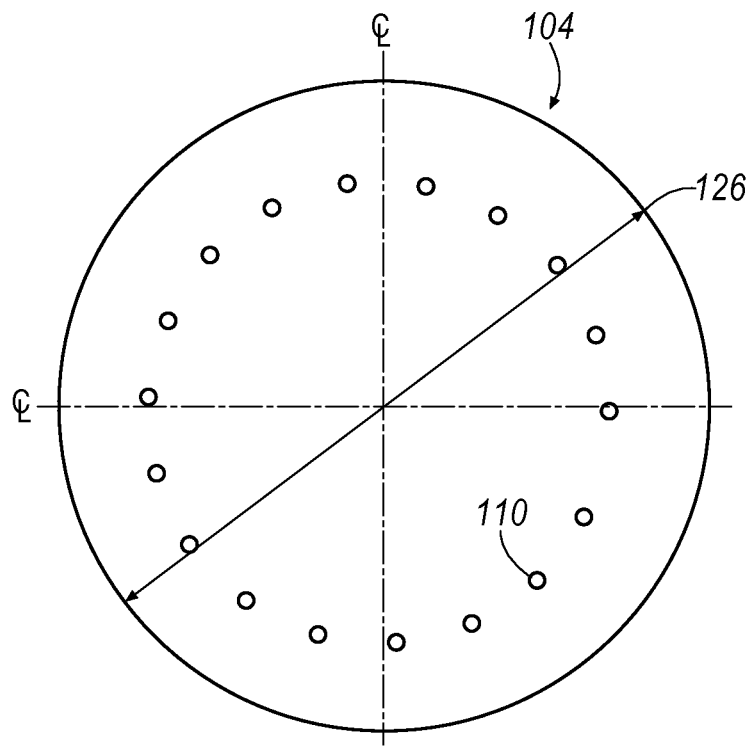
FIG. 4 illustrates an exemplary removable portion, for example, having an attachment in a circular configuration.
Figure 5:
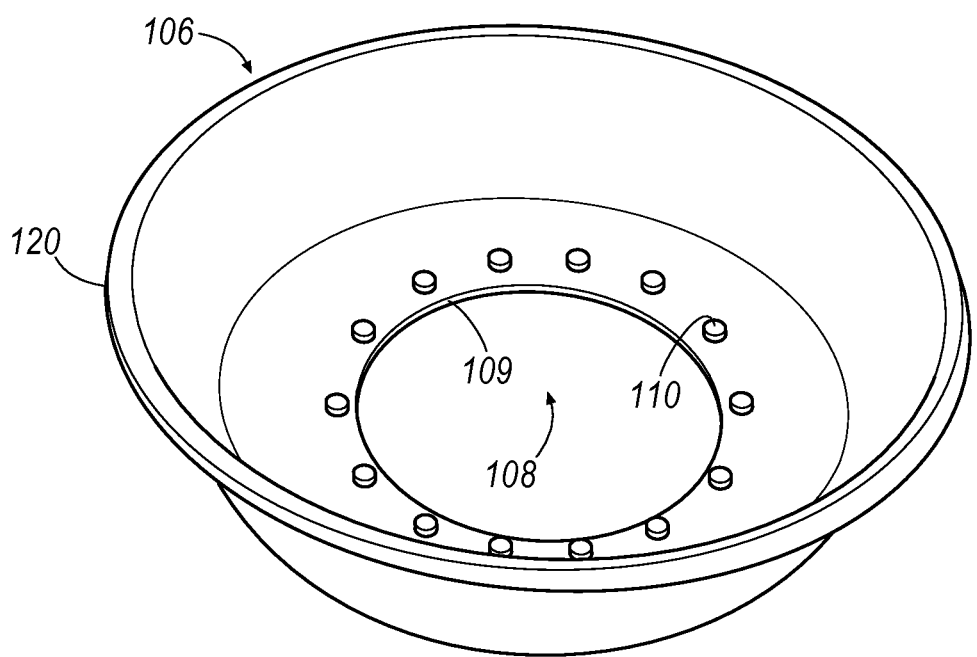
FIG. 5 illustrates an exemplary base portion, for example, having an attachment in a circular configuration.

With reference to FIGS. 3-5, the pan system 100 may include one or a plurality of attachments 110, for example, to releasably attach and selectively remove the removable portion 104 from the base portion 106 in the respective closed and open configurations. As shown in FIG. 3, removable portion 104 may include attachment 110a and base portion 106 may alternatively or additionally include attachment 110b. Attachments 110 may be in any shape, pattern, increment, or configuration. As shown in FIGS. 4-5, attachments 110 may be in a circular configuration, e.g., positioned anywhere along or between periphery 109 and sidewall 116. The attachment 110 may include any physical interlock including, for example, a chemical interlock, a mechanical interlock, or a combination thereof.

Figure 10:
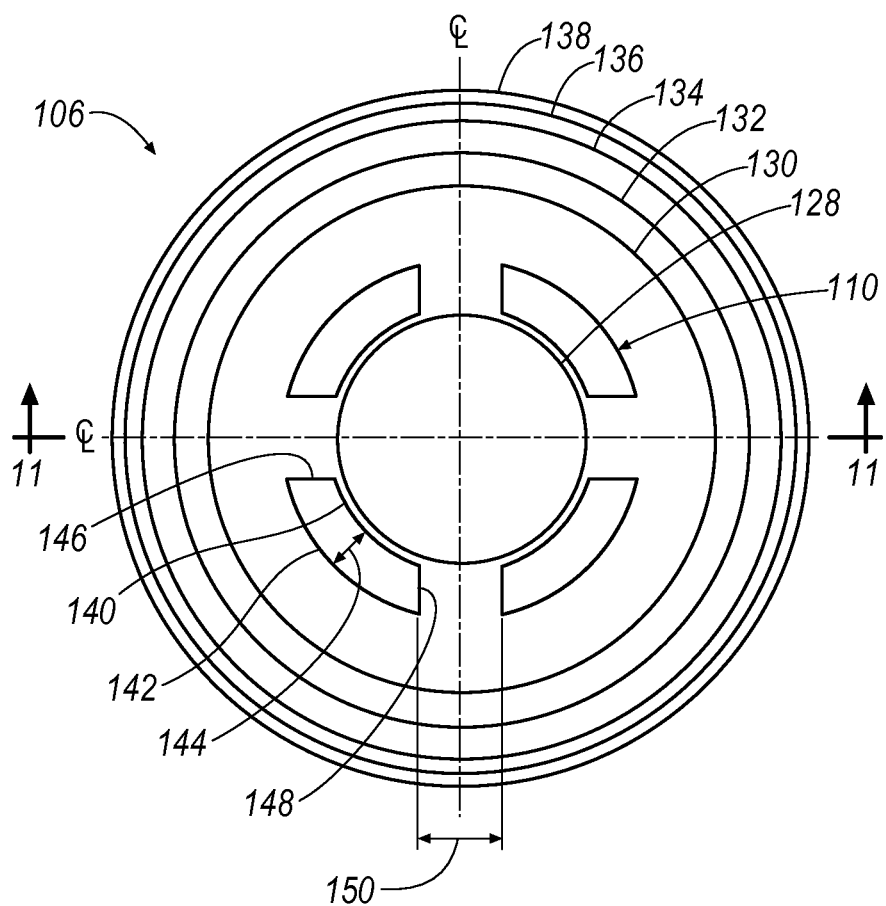
FIG. 10 illustrates a top view of the base portion of FIG. 5, for example, having an attachment in an arcuate configuration.

An exemplary attachment 110 may include a chemical interlock, e.g., in a circular configuration as shown in FIGS. 4-5 or in an arcuate configuration as shown in FIG. 10 and described in further detail below. An exemplary chemical interlock may include an adhesive, for example, a food grade adhesive. The attachment 110 may be applied to a plurality of locations about removable portion 104, base portion 106, or a combination thereof. The attachment 110 may be configured to adhere or bond the removable portion 104 and base portion 106 for receipt of food products 102. The attachment 110 may be configured to release the removable portion 104 from the base portion 105 by becoming less adhesive or tacky in response to heat, for example, from defrosting, thawing, cooking, or baking. For example, the attachment 110 may degrade in response to heat thereby releasing the bond between the removable portion 104 and base portion 106. After being heated, the removable portion 104 and base portion 106 may be separated with a force from the user. Then, the removable portion 104 may be utilized to handle and customize the food product.

With reference to FIGS. 6-9, exemplary attachment 110 may also include a mechanical interlock, for example, in addition to or as an alternative to the chemical interlock. The attachment 110a and attachment 110b may selectively engage to provide a twist or push lock thereby releasably securing the removable portion 104 and base portion 106. The tolerances of the attachment 110 may be configured to minimize a gap between the removable portion 104 and base portion 106 thereby reducing the escape of food product 102 through the gap. For example, as shown in FIG. 6A, the attachment 110a may include one or plurality of features configured to physically engage the attachment 110b thereby releasably securing the removable portion 104 and the base portion 106 in the closed condition (e.g., FIG. 6B) and selectively releasing the removable portion 104 and base portion 106 in the open condition (e.g., FIG. 7). For example, attachment 110a of removable portion 104 may include any male locking feature (e.g., a protrusion such as a tab or lip) and attachment 110b of base portion 106 may include a corresponding female locking feature (e.g., a recess such as a groove or slot for receiving the male locking feature). Alternatively, the attachment 110a may include a female locking feature and attachment 110b may include a corresponding male locking feature. In addition, exemplary attachments 110a and 110b may include a push locking feature.

Figure 6A:
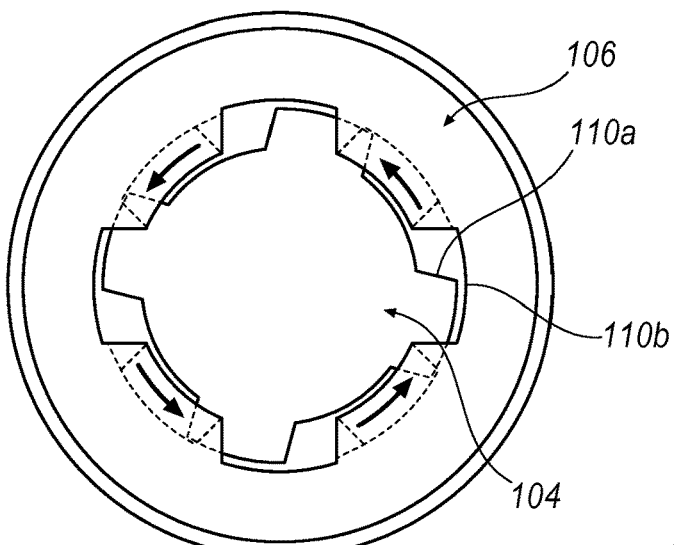
FIG. 6A illustrates a pan system having an exemplary attachment.
Figure 6B:
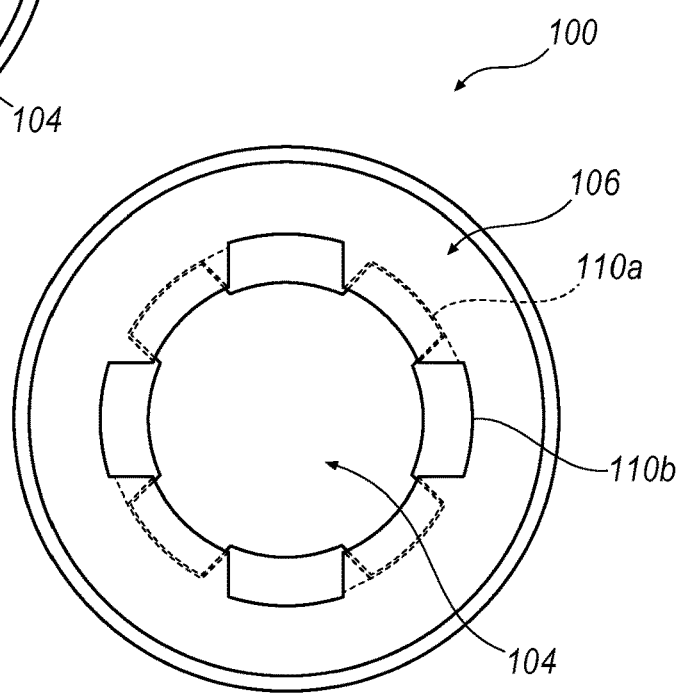
FIG. 6B illustrates the exemplary attachment of FIG. 6A, for example, in an closed configuration.
Figure 7:
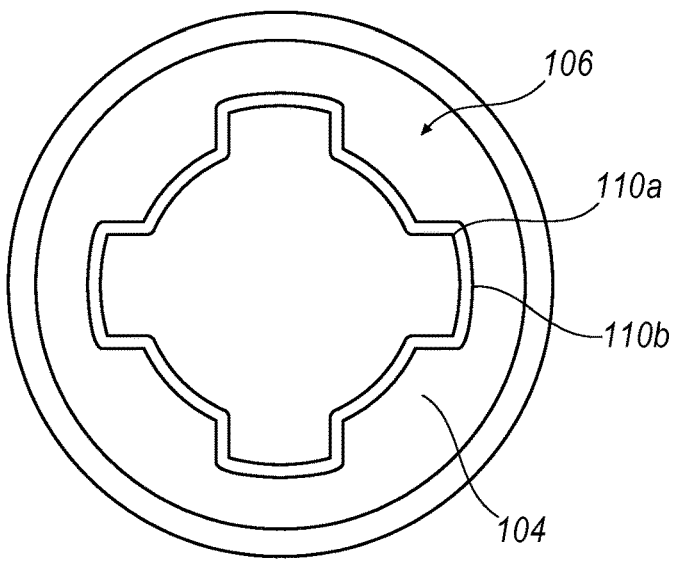
FIG. 7 illustrates the exemplary attachment of FIG. 6B, for example, in an open configuration.

For example, to separate the mechanical interlock, the removable portion 104 may be rotated or pushed relative to the base portion 106. For example, as shown in FIG. 6A, the removable portion 104 may be rotated relative to the base portion 106 from the closed configuration (e.g., FIG. 6B) to the open condition (e.g., FIG. 7) thereby aligning the attachment 110a (e.g., shown as a male locking feature) and the attachment 110b (e.g., shown as a corresponding female locking feature). With the attachment 110a and 110b aligned as shown in FIG. 7, a force from a user may separate the removable portion 104 from the base portion 106. Alternatively, the mechanical interlock may be separated with a push form a user without rotation. Thus, the mechanical interlock may releasably attach in the closed configuration (e.g., before or during baking) and selectively release to allow the open configuration (e.g., after baking).

Figure 8:
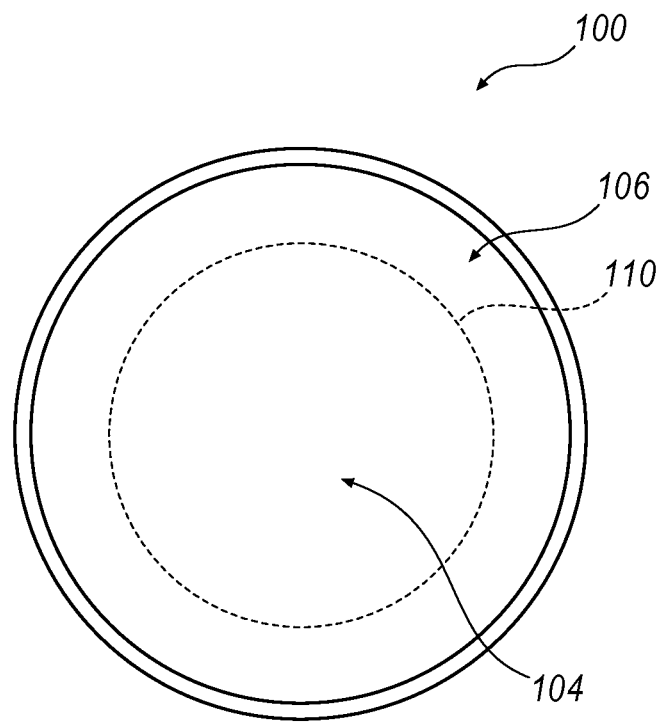
FIG. 8 illustrates another exemplary attachment, for example, in a closed configuration.
Figure 9:
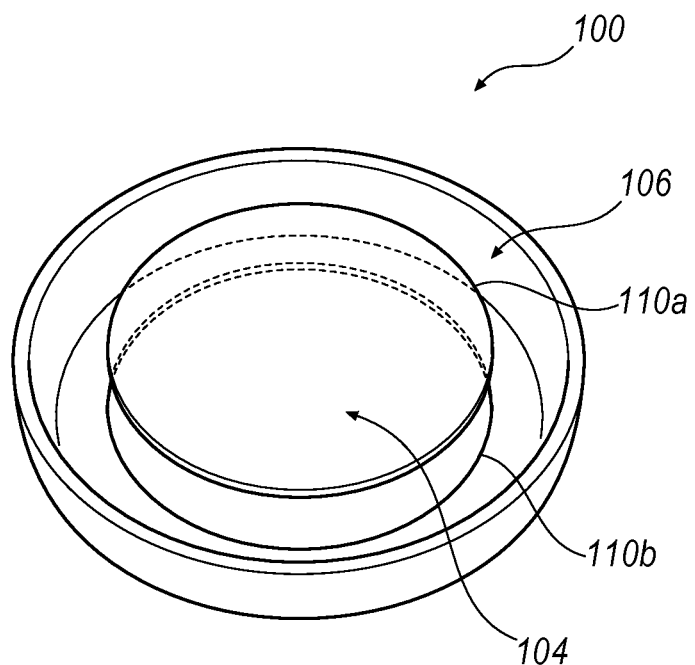
FIG. 9 illustrates the exemplary attachment of FIG. 8, for example, in an open configuration.

Alternatively, referring to FIGS. 8-9, the removable portion 104 and base portion 106 may be formed of the same structure. The attachment 110 may include a mechanical interlock including a perforation including a plurality of apertures defining and joining the periphery 109 of the base portion 106 and the periphery 126 of the removable portion 104. In the closed configuration, as shown in FIG. 8, the attachment 110 may join the periphery 109 and the periphery 126 thereby retaining the food product 102 prior to and during baking Thus, the attachment 110 may be disposed between and define the removable portion 104 and the base portion 106. The attachment 110 may include a spacing and have apertures dimensioned to reduce the escape of the food product prior to and during baking and may be separated after baking to allow removal of the removable portion 104. To separate the removable portion 104 and base portion 106, as shown in the open configuration in FIG. 9, the attachment 110 may be broken in response to a force from the user or heat as discussed in further detail below. Separation of the attachment 110 allows the removable portion 104 with the food product 102 to move relative to the base portion 106. Thus, the perforation may allow the removable portion 104 to be separated from the base portion 106 thereby allowing removal and handling of the removable portion 104 to facilitate serving of a food product.

The attachment 110 may be configured to maintain the closed condition for baking and release the removable portion 104 in response to heat thereby allowing the open condition after baking. For example, the attachment 110 may also be configured to partially or entirely degrade in response to heat from baking. The attachment 110 may be dimensioned with a reduced thickness relative to the removable portion 104 and the base portion 106 thereby making the attachment 110 relatively fragile and more susceptible to heat degradation during baking. The attachment 110 may also be at least partially covered or impregnated with a heat reactive material (e.g., a food grade plastic or oil) to increase the relative heat retained at and applied to the attachment 110, thereby increasing the relative degradation of the attachment 110. Thus, the attachment 110 may be configured to change from the closed configuration to the open configuration in response to heat from baking.

Figure 11:
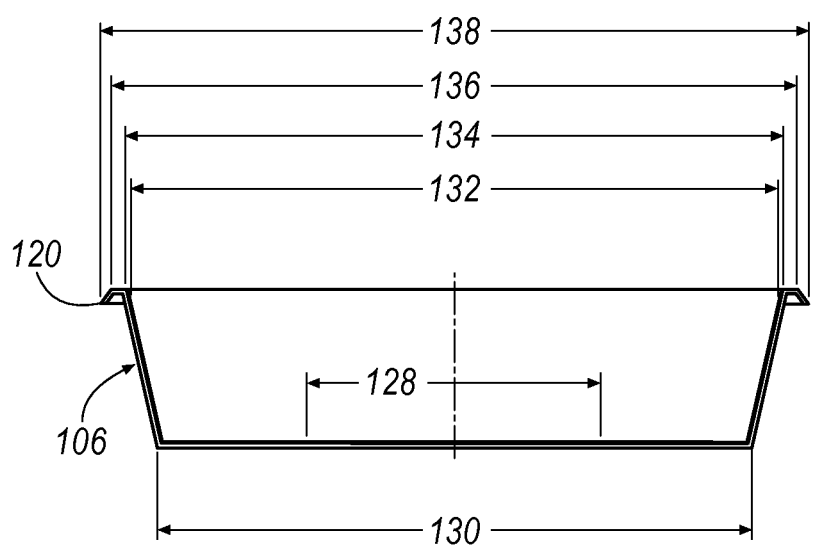
FIG. 11 illustrates a side view of the base portion of FIG. 5.

The pan system 100 may be formed from a laminated sheet. The laminated sheet may be formed by co-extruding sheets of paperboard (e.g., SBS) with plastic, which be used to form the base portion 106 and removable portion 104. Referring to FIGS. 10-11, a first portion of laminated sheet may form the base portion 106 by cutting opening 108 along line 128 (e.g., using a circular die), forming sidewall 116, bottom 119, and angle 124 along lines 130-134 (e.g., using one or a plurality of mandrel dies), cutting to create lip 120 along line 138 (e.g., using a circular die), and performing a turn-down to form angle 158 of the lip 120 about line 136. Attachments 110 may be applied to the sheet before or after the forming of any of lines 128-138.

One or a plurality of attachments 110 may have an arcuate configuration, as shown in FIG. 10. Attachment 110 may include any physical interlock including, for example, a chemical interlock (e.g., an adhesive), a mechanical interlock, or a combination thereof. Each attachment 110 may include an inner boundary 140, an outer boundary 142, a first sidewall 146, and a second sidewall 148. Inner boundary 140 and outer boundary 142 may be separated by a width 144, which may be constant as shown or may increase or decrease between the first and second sidewalls 146, 148. The first and second sidewalls 146, 148 may be along the centerline of base portion 106 as shown or may be in a radial direction from the center of the base portion 106. Attachments 110 may be in any increment, e.g., one solid attachment 110 with no space 150, two attachments 110 with two spaces 150, three attachments 110 with three spaces 150, four attachments 110 with four spaces 150 (as shown), five attachments 110 with five spaces 150, or any number of additional attachments 110 and spaces 150. Attachments 110 may be at any position along or between line 128 and line 130. Attachments 110 may be positioned in any pattern, e.g., radially positioned at equal (as shown) or varying distances from line 128, line 130, or the center of base portion 106.

Figure 12:
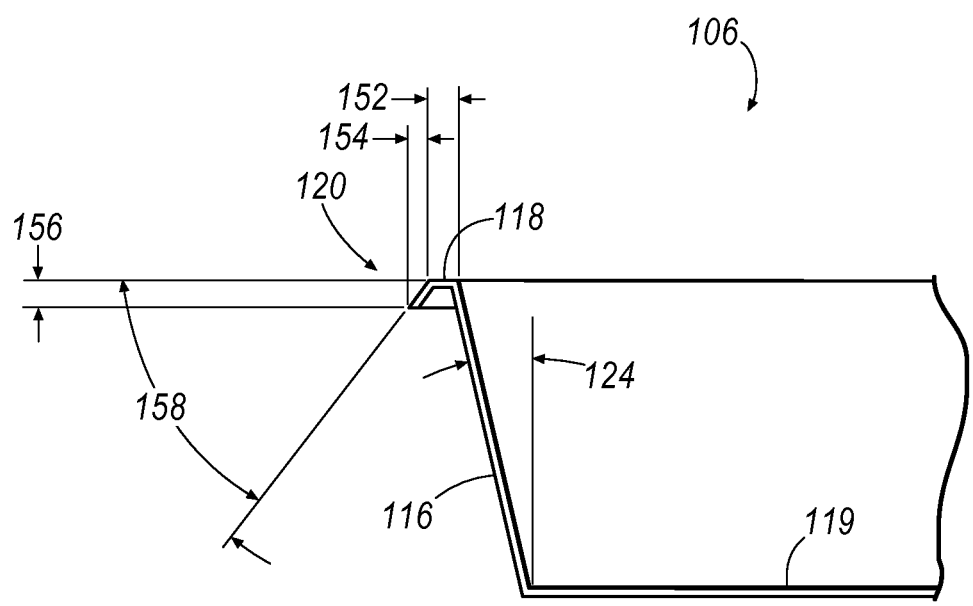
FIG. 12 illustrates a closer view of the base portion of FIG. 11.

As shown in FIG. 12, the lip 120 may include a flat portion 152 and a tapered portion 154 having a depth 156 and at an angle 158, e.g., approximately forty-five degrees. The lip 120 may be configured to add rigidity to and thereby support the sidewall 116, for example, prior to, during, and after baking Referring to FIG. 4, a second portion of the laminated sheet may be cut (e.g., using a circular die) to form the removable portion 104 along periphery 126. The removable portion 104 may then be placed into the base portion 106 and attached using attachment 110, as discussed above.

Methods for using the pan system 100 having an open condition and a closed condition to selectively release the food product 102 are contemplated. The food product 102 (e.g., in the form of an uncooked mixture) may be placed in the pan system 100 having the removable portion 104 and the base portion 106 with an opening 108. The removable portion 104 may span the opening 108 and be releasably secured to the base portion 106 with the attachment 110. Using an appliance, heat may be applied to the pan system 100 with the food product 102 (e.g., for a predefined time period and at a predefined temperature) thereby allowing the food product 102 to cook and releasing the attachment 110 in response to heat. Near or upon expiration of the predefined time period, the pan system 100 with the food products 102 (e.g., in the form of baked goods) may be removed and allowed to cool. After at least a portion of the pan system 100 is cooled, the pan system 100 may be elevated and a force may be applied to the removable potion 104 through the opening 108 thereby separating the removable portion 104 with the food product 102 from the base portion 106. Thus, the base portion 106 and removable portion 104 may be configured to contain the food product 102 in the closed condition and separate to release the food product 102 from the base portion 106 in the open condition.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A pan system having a closed condition and an open condition to selectively release a food product, the system comprising:
   a base portion having an outer sidewall connected to a continuous bottom that extends inwardly to form a central opening that does not span an entirety of the continuous bottom;
   a removable portion spanning between the central opening in the base portion and adjacent to an inner surface of the outer sidewall; and
   a plurality of attachments, each having an arcuate configuration and being positioned in increments with corresponding spaces about the central opening, between an upper surface of the base portion and a lower surface of the removable portion,
   wherein each of the plurality of attachments include an inner boundary, an outer boundary, a first sidewall, and a second sidewall, the inner and outer boundaries being separated by a width and forming a concentric circular arrangement between the upper surface of the base portion and the lower surface of the removable portion, the concentric circular arrangement being interrupted by the corresponding spaces between the respective first and second sidewalls,
   wherein the plurality of attachments releasably secure the removable portion relative to the base portion in the closed condition prior to cooking the food product and selectively release the removable portion from the base portion in response to heat and remove the removable portion from the base portion in response to a force through the central opening to provide the open condition, and
   wherein the base portion and the removable portion are configured to contain the food product in the closed condition and separate to release the food product from the base portion in the open condition.

2. The pan system of claim 1, wherein the plurality of attachments, in increments with corresponding spaces, includes an adhesive to releasably secure the removable portion relative to the base portion.

3. The pan system of claim 2, wherein at least one of the plurality attachments is configured to maintain the closed condition prior to baking and allow the open condition after baking.

4. The pan system of claim 2, wherein the adhesive is configured to release the removable portion in response to heat.

5. The pan system of claim 1, wherein the arcuate configuration is formed by the inner and outer boundaries and the first and second sidewalls, and the width includes at least one of a constant width, a decreasing width, and an increasing width between the first and second sidewalls, and
   wherein the arcuate configuration at least one of:
      upwardly extends from the upper surface of the base portion to engage the lower surface of the removable portion, and
      downwardly extends from the lower surface of the removable portion to engage the upper surface of the base portion.

6. The pan system of claim 1, wherein at least one of the plurality of attachments includes a mechanical interlock and a chemical interlock between the base portion and the removable portion.

7. The pan system of claim 1, wherein the base portion includes a lip that is turned downward relative to the sidewall.

8. A pan system having a closed configuration and an open configuration to selectively release a food product, the system comprising:
   a base portion having an outer sidewall connected to a continuous bottom that extends inwardly to form a central opening that does not span an entirety of the continuous bottom;
   a removable portion spanning between the central opening in the base portion and adjacent to an inner surface of the outer sidewall; and
   a plurality of attachments, each having an arcuate configuration and being positioned in increments with corresponding spaces about the central opening, between an upper surface of the base portion and a lower surface of the removable portion,
   wherein each of the plurality of attachments include an inner boundary, an outer boundary, a first sidewall, and a second sidewall, the inner and outer boundaries being separated by a width and forming a concentric circular arrangement between the upper surface of the base portion and the lower surface of the removable portion, the concentric circular arrangement being interrupted by the corresponding spaces between the respective first and second sidewalls,
   wherein the plurality of attachments releasably secure the removable portion relative to the base portion in the closed condition prior to cooking the food product and selectively release the removable portion from the base portion in response to heat and remove the removable portion from the base portion in response to a force through the central opening to provide the open condition, and
   wherein the base portion and the removable portion are configured to contain the food product in the closed condition and separate to release the food product from the base portion in the open condition.

9. The pan system of claim 8, wherein the plurality of attachments, in increments with corresponding spaces, includes an adhesive to releasably secure the removable portion relative to the base portion.

10. The pan system of claim 9, wherein at least one of the plurality of attachments is configured to maintain the closed condition prior to baking and allow the open condition after baking.

11. The pan system of claim 9, wherein the adhesive is configured to release the removable portion in response to heat.

12. The pan system of claim 8, wherein the arcuate configuration is formed by the inner and outer boundaries and the first and second sidewalls, and the width includes at least one of a constant width, a decreasing width, and an increasing width between the first and second sidewalls, and
   wherein the arcuate configuration at least one of:
      upwardly extends from the upper surface of the base portion to engage the lower surface of the removable portion, and
      downwardly extends from the lower surface of the removable portion to engage the upper surface of the base portion.

13. The pan system of claim 8, wherein at least one of the plurality of attachments includes a mechanical interlock and a chemical interlock between the base portion and the removable portion.

14. The pan system of claim 8, wherein the base portion includes a lip that is turned downward relative to the sidewall.

15. A pan system to selectively release a food product, the system comprising:
- a base portion having an outer sidewall connected to a continuous bottom that extends inwardly to form a central opening that does not span an entirety of the continuous bottom;
- a removable portion spanning between the central opening in the base portion and adjacent to an inner surface of the outer sidewall; and
- a plurality of attachments, each having an arcuate configuration and being positioned in increments with corresponding spaces about the central opening, between an upper surface of the base portion and a lower surface of the removable portion,
- wherein each of the plurality of attachments include an inner boundary, an outer boundary, a first sidewall, and a second sidewall, the inner and outer boundaries being separated by a width and forming a concentric circular arrangement between the upper surface of the base portion and the lower surface of the removable portion, the concentric circular arrangement being interrupted by the corresponding spaces between the respective first and second sidewalls,
- wherein the plurality of attachments releasably secure the base portion to the removable portion prior to cooking the food product, and
- wherein the plurality of attachments are releasable in response to heat and removable in response to a force through the central opening.

16. The pan system of claim 15, wherein the plurality of attachments, in increments with corresponding spaces, includes an adhesive to releasably secure the removable portion relative to the base portion.

17. The pan system of claim 16, wherein the adhesive is configured to release the removable portion in response to heat.

18. The pan system of claim 15, wherein the arcuate configuration is formed by the inner and outer boundaries and the first and second sidewalls, and the width includes at least one of a constant width, a decreasing width, and an increasing width between the first and second sidewalls, and
- wherein the arcuate configuration of the plurality of attachments at least one of:
  - upwardly extends from the upper surface of the base portion to engage the lower surface of the removable portion, and
  - downwardly extends from the lower surface of the removable portion to engage the upper surface of the base portion.

19. The pan system of claim 15, wherein at least one of the plurality of attachments includes a mechanical interlock and a chemical interlock between the base portion and the removable portion.

20. The pan system of claim 15, wherein the base portion includes a lip that is turned downward relative to the sidewall.

* * * * *